United States Patent
Konno et al.

(10) Patent No.: US 9,199,680 B2
(45) Date of Patent: Dec. 1, 2015

(54) VEHICLE ANTI-THEFT DEVICE

(75) Inventors: Takeshi Konno, Wako (JP); Naoyuki Yamate, Wako (JP); Yoshiaki Hirakata, Wako (JP); Hitoshi Tsusaka, Wako (JP); Wayne Alves, Sao Paulo-SP (BR)

(73) Assignees: Honda Motor Co., Ltd., Tokyo (JP); Kostal Electromecanica Ltda., Sao Paulo (BR)

( * ) Notice: Subject to any disclaimer, the term of this patent is extended or adjusted under 35 U.S.C. 154(b) by 31 days.

(21) Appl. No.: 14/123,885

(22) PCT Filed: Jun. 23, 2011

(86) PCT No.: PCT/JP2011/064414
§ 371 (c)(1),
(2), (4) Date: Jan. 23, 2014

(87) PCT Pub. No.: WO2012/176306
PCT Pub. Date: Dec. 27, 2012

(65) Prior Publication Data
US 2014/0125472 A1 May 8, 2014

(51) Int. Cl.
B60R 25/10 (2013.01)
B62H 5/00 (2006.01)
B62M 7/02 (2006.01)
G08B 13/14 (2006.01)

(52) U.S. Cl.
CPC ................. B62H 5/001 (2013.01); B62H 5/00 (2013.01); B62M 7/02 (2013.01); G08B 13/1436 (2013.01)

(58) Field of Classification Search
CPC ................. B60R 2025/1013; B60R 2325/306; B60R 16/02; B60R 25/00; B60R 25/01; B60R 25/10; B60R 25/40; B62H 5/00

USPC ................. 340/427, 5.22, 426.14, 5.61, 5.72, 340/426.2, 429, 425.5, 426.22; 307/10.5, 307/9.1, 10.2, 10.7; 180/219, 287
See application file for complete search history.

(56) References Cited

U.S. PATENT DOCUMENTS

| 4,322,714 | A  | * | 3/1982 | Morgan | 340/427 |
| 6,956,473 | B2 | * | 10/2005 | Hanood | 340/522 |
| 7,034,665 | B2 | * | 4/2006 | Kojika et al. | 340/427 |
| 7,042,343 | B2 | * | 5/2006 | Konno et al. | 340/427 |
| 8,514,053 | B2 | * | 8/2013 | Ito | 340/5.22 |
| 8,648,701 | B2 | * | 2/2014 | Hojo et al. | 340/426.1 |
| 2007/0268117 | A1 | * | 11/2007 | Moffett | 340/426.2 |
| 2009/0284358 | A1 |   | 11/2009 | Ieda et al. | |

FOREIGN PATENT DOCUMENTS

| JP | 2009-299455 A | 12/2009 |
| JP | 2010-072750 A | 4/2010 |
| JP | 2010-213081 A | 9/2010 |

* cited by examiner

*Primary Examiner* — Toan N Pham
(74) *Attorney, Agent, or Firm* — Carrier Blackman & Associates, P.C.; Joseph P. Carrier; Fulchand P. Shende

(57) ABSTRACT

A vehicle anti-theft device (60) is configured from: a box-like case body (132) having on the bottom (161) a hole (173) through which air comes in and goes out; a movement display member (170) of which the center is arranged along the perpendicular line extending from the center of the hole (173), and which is secured to the ceiling (162) of the case body by means of a tool (176) inserted from the hole (173) and transmits the movement, state to the outside of the case body (132); and a substrate (67) which is built into the case body (132) and on which electronic components for actuating the movement display member (170) are mounted.

2 Claims, 7 Drawing Sheets

VEHICLE ANTI-THEFT DEVICE

TECHNICAL FIELD

The present invention relates to a vehicle anti-theft device.

BACKGROUND ART

A vehicle anti-theft device mounted on a vehicle for preventing theft of the vehicle is disclosed, for example, in Patent Literature 1.

In the vehicle anti-theft device disclosed in Patent Literature 1, abnormality of the vehicle is detected by a sensor. An abnormality signal from the sensor is transmitted to a control section, and then sent to a base station by a mobile phone communication unit. The abnormality signal is reported to a monitoring center from the base station via a mobile phone communication network, and then reported with position information to a mobile device of a vehicle user, thereby preventing theft of the vehicle.

The vehicle anti-theft device includes an operation display member for displaying an operation state of the vehicle anti-theft device.

Although it is not described in the Patent Literature 1, the operation display member is attached to a case of the vehicle anti-theft device from outside of the case.

It is a general practice that the operation display member is fitted to the case from the outside and fixed by an adhesive. The adhesive remains on an outer surface of the case, and therefore a cleaning process is required for removing the remainders of the adhesive.

Instead, if the operation display member is fitted to the case from inside, the adhesive does not remain on the outer surface of the case, and thus the cleaning process can be omitted.

In small vehicles, such as two-wheeled motor vehicles, a space for installing additional components is limited. Therefore, the vehicle anti-theft device is desired to be small, and thus the case of the vehicle anti-theft device is necessarily small.

When the operation display member is attached to such a small case from the inside, the attachment operation would be complicated, leading to increase of the manufacturing cost of the vehicle anti-theft device.

Thus, a technique is desired which enables reduction of the manufacturing cost of the vehicle anti-theft device for the small vehicle by omitting the additional process and the complicated attachment operation.

PRIOR ART LITERATURE

Patent Literature

Patent Literature 1: Japanese Patent Application Laid-Open Publication No. 2010-72750

SUMMARY OF INVENTION

Technical Problems

It is therefore an object of the present invention to provide a vehicle anti-theft device which can reduce the manufacturing cost.

Solutions to Problems

According to the invention, there is provided a vehicle anti-theft device adapted to be mounted on a vehicle for preventing theft of the vehicle, comprising: a box-like case having on a bottom thereof a hole through which air comes in and goes out; an operation display member for transmitting an operation state of the vehicle anti-theft device to outside of the case, the operation display member having a center vertically aligned with a center of the hole and secured to a ceiling of the case by means of a tool inserted from the hole; and a substrate built in the case and having electronic components mounted thereon for operating the operation display member.

Preferably, the operation display member is composed of a light emitting element mounted on the substrate, and a resin lens welded to the ceiling for transmitting therethrough light from the light emitting element.

Preferably, the vehicle anti-theft device further comprises a dedicated battery accommodated in the case for supplying power to the substrate, wherein the case includes a case body, and a lid detachably attached to the case body so as to allow the battery and the substrate to be inserted in or removed from the case, and wherein the light emitting element is mounted on the substrate at a position close to the lid.

Preferably, the case further includes a seal member provided between the body and the lid.

Advantageous Effects of Invention

In the invention as defined in claim 1, the operation display member is secured to the ceiling of the case with the center thereof vertically aligned with the center of the hole on the bottom of the case.

To secure the operation display member to the ceiling of the case, the tool is inserted through the hole formed in the bottom of the case. Since the tool can be straightly brought into contact with the operation display member, the operation display member can be easily attached to the case, with the result that the manufacturing cost can be reduced.

In the invention as defined in claim 2, the operation display member is composed of the light emitting element, and the resin lens welded to the ceiling for transmitting therethrough light from the light emitting element.

The operation display member may be an electric bulb having a filament as a light emitting body and a glass bulb surrounding the filament.

However, since the glass bulb is large, the ceiling must have a large set hole for such an operation display member.

In the present invention, the light emitting body is separated from the glass bulb, and the light emitting element such as a light emitting diode and the resin lens are used instead of the light emitting body and the glass bulb.

For the resin lens alone, the set hole formed in the ceiling can be smaller in diameter, and the small-diameter set hole can be easily waterproofed.

In the invention as defined in claim 3, the light, emitting element is mounted on the substrate at the position close to the lid.

By removing the lid from the case body and slightly drawing the substrate out of the body, the light emitting element is exposed to outside the body. Namely, it is possible to see and check the light emitting element simply by slightly drawing out the substrate from the case body. There is no need to draw the whole substrate out of the case body, and thus an inspection operation of the light, emitting element can be quickly performed.

In the invention as defined in claim 4, the seal member is provided between the body and the lid.

Owing to the sealing effect of the seal member, it is possible to prevent water infiltration from a gap between the body and the lid.

DESCRIPTION OF EMBODIMENT

A certain preferred embodiment of the present invention will be described in detail below with reference to the accompanying drawings.

Embodiment

The following is a description of the embodiment of the present invention with reference to the drawings.

Figure 1:
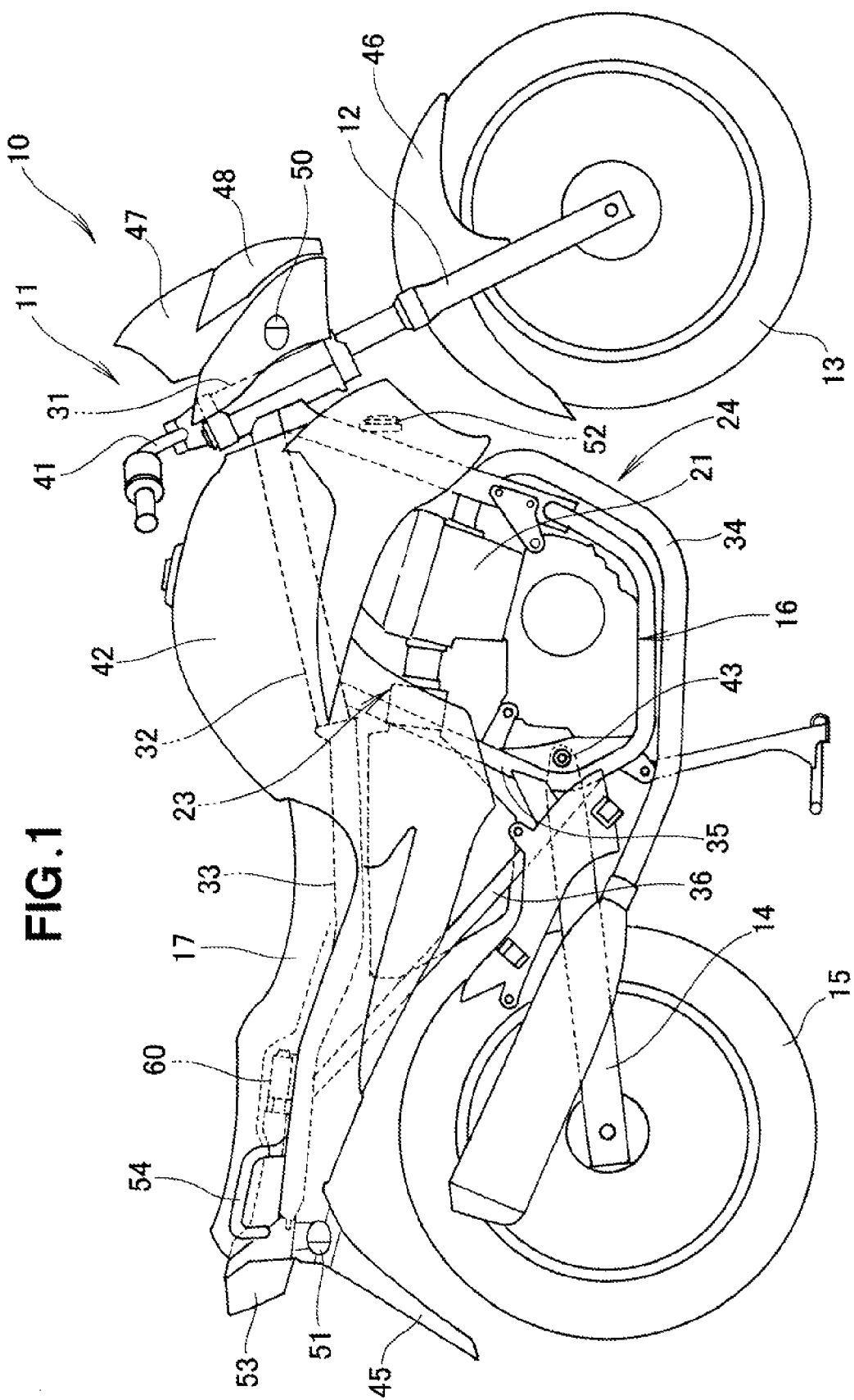
FIG. 1 is a right side view showing a two-wheeled motor vehicle provided with a vehicle anti-theft device according to the present invention.

As shown in FIG. 1, a two-wheeled motor vehicle or motorcycle 10 includes a vehicle body frame 11, a front fork 12 provided at a front part of the vehicle body frame 11, a front wheel 13 mounted on the front folk 12 at a lower end thereof, a swing arm 14 extending rearward from the vehicle body frame 11, and a rear wheel 15 mounted on the swing arm 14 at a rear end thereof.

An engine 16 is disposed between the front wheel 13 and the rear wheel 15. The engine 16 is suspended to the vehicle body frame 11. An intake system 23 for supplying air-fuel mixture and an exhaust system 24 for discharging exhaust gas are connected to a cylinder unit 21 of the engine 16. A seat 17 on which a vehicle driver sits astride is mounted to the vehicle body frame 11 between the front wheel 13 and the rear wheel 15.

The vehicle body frame 11 includes a head pipe 31, a main frame 32 extending rearward from the head pipe 31, a seat rail 33 extending rearward from the main frame 32, a lower frame 34 extending obliquely rearward and downward from the head pipe 31 and then extending rearward, a central frame 35 extending from the main frame 32 and connected to a rear end of the lower frame 34, and a rear frame 36 extending obliquely rearward and upward from the central frame 35 and connected to a rear part of the seat rail 33.

The front folk 12 is steerably supported by the head pipe 31. A handlebar 41 is mounted on the front folk 12 at an upper end thereof, and the front wheel 13 is mounted on the front folk 12 at the lower end thereof. A fuel tank 42 is disposed above the engine 16 and between the handlebar 41 and the seat 17. The fuel tank 42 is supported by the main frame 32.

At a lower part of the central frame 35, a pivot shaft 43 is provided to extend in a vehicle width direction. The swing arm 14 which extends rearward and supports the rear wheel 15 is supported on the pivot shaft 43.

A front fender 46 for blocking mud splashed by the front wheel 13 is mounted on a lower part of the front folk 12, and a front cowl 47 is mounted on an upper part of the front folk 12. The front cowl 47 is provided with a headlight. 48 on a front surface thereof, and front blinkers 50 on lateral sides thereof.

A horn 52 is attached to the lower frame 34. A rear fender 45 for blocking mud splashed by the rear wheel 15 is mounted on the seat rail 33. The rear fender 45 is provided with a stop lamp 53 directed rearward, and rear blinkers 51 on lateral sides thereof.

Disposed on the rear part of the seat rail 33 is a vehicle anti-theft device 60 which is configured to detect abnormality of the vehicle and notify it to the outside when the vehicle is subjected to a theft action.

A grab rail 54 which can be gripped by a vehicle passenger is attached to the seat rail 33 at a rear of the vehicle anti-theft device 60.

Next will be described a support structure of the vehicle anti-theft device.

Figure 2:
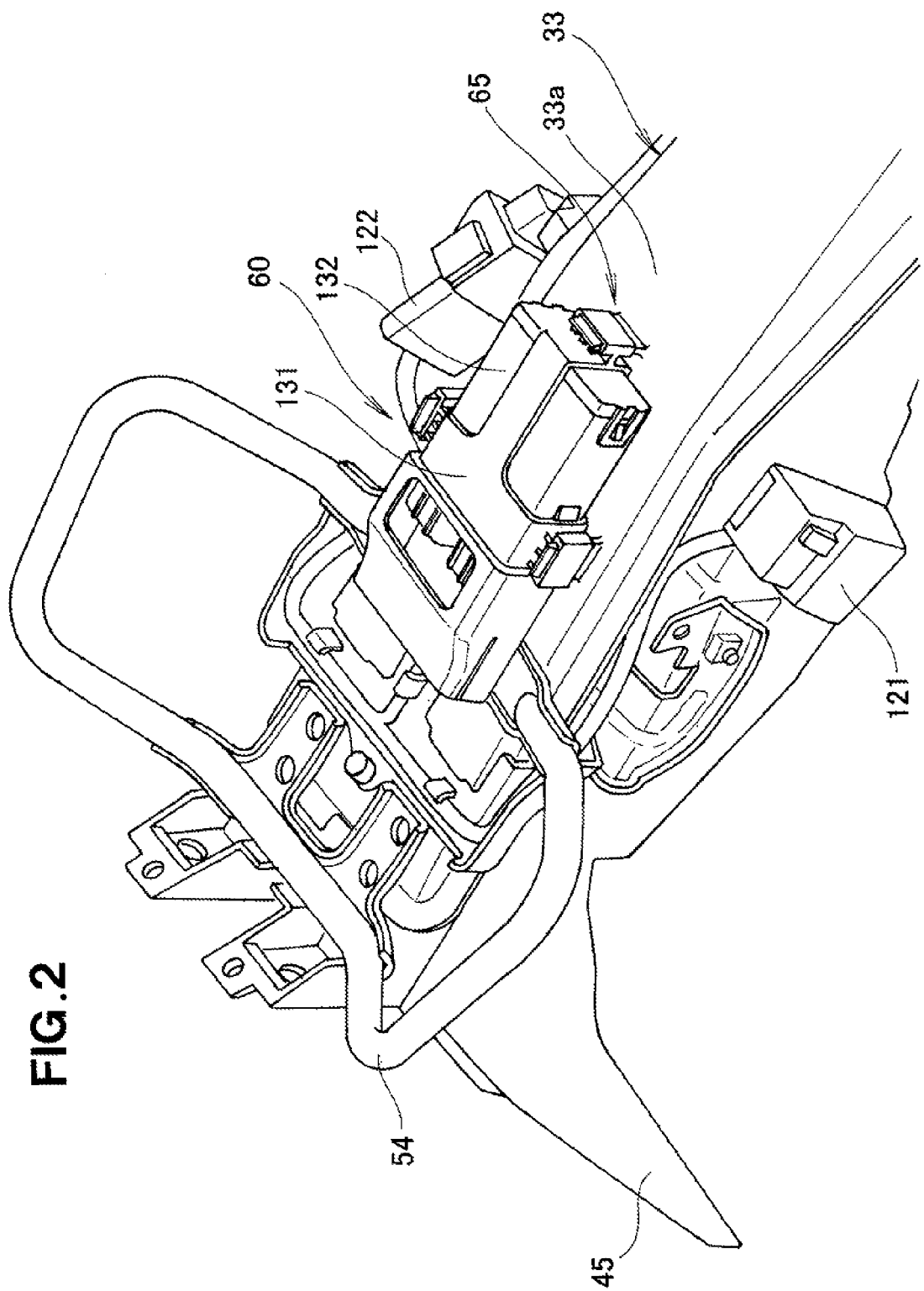
FIG. 2 is a perspective view showing an essential part of FIG. 1.

As shown in FIG. 2, the vehicle anti-theft device 60 is mounted on an upper surface 33a of the seat rail 33 substantially at a center in the vehicle width direction. The vehicle anti-theft device 60 is supported by a support stay 65 welded to the upper surface 33a of the seat rail 33.

A box-like case 132 covering the outside of the vehicle anti-theft device 60 is surrounded or wrapped by an elastic member 131 extending in longitudinal and transversal directions. The elastic member 131 is attached to the support stay 65 welded to the upper surface 33a of the seat rail 33.

Next will be explained a block diagram of the vehicle anti-theft device and a peripheral part thereof.

Figure 3:
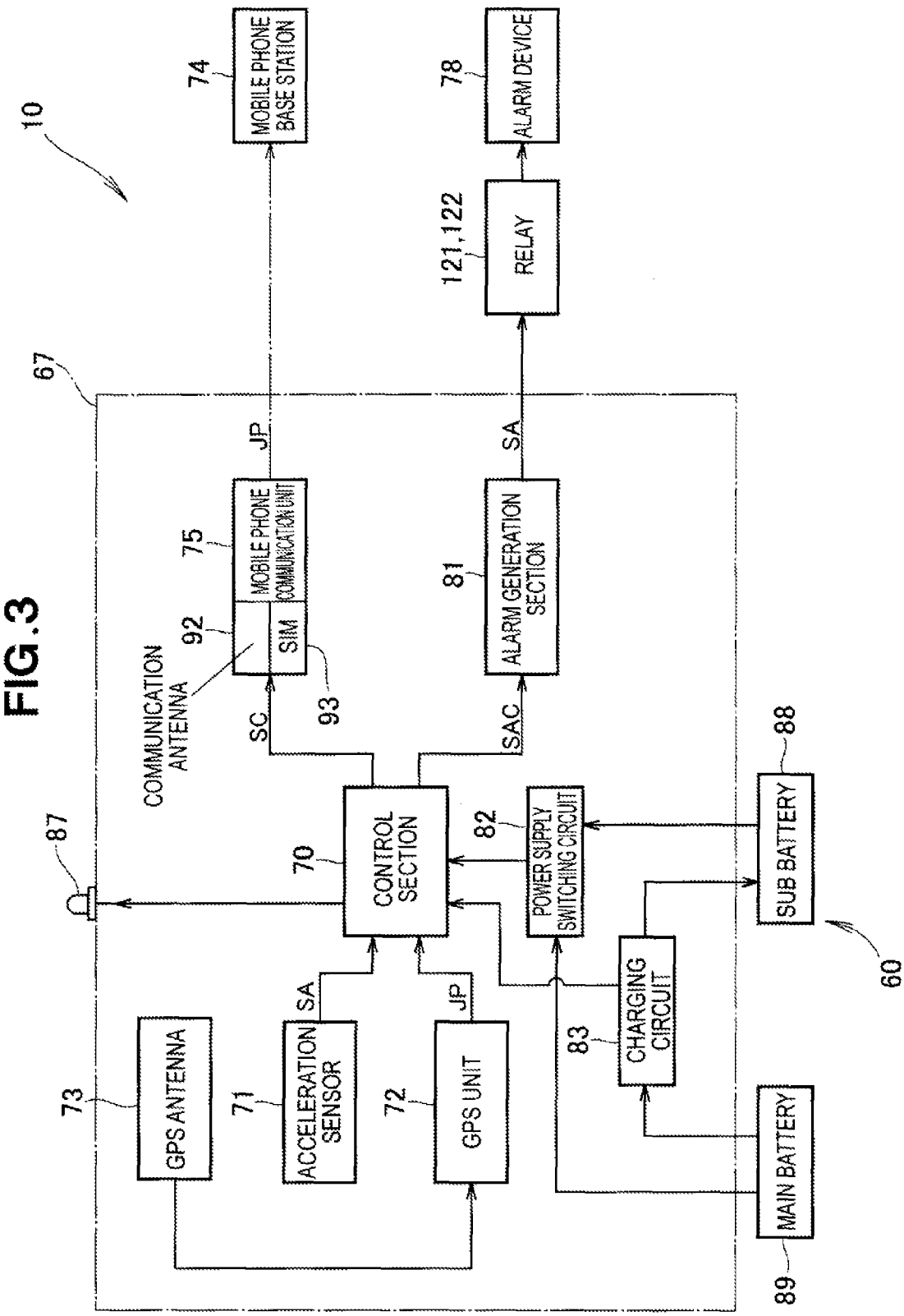
FIG. 3 is a block diagram of the vehicle anti-theft device and a peripheral part thereof.

In FIG. 3, the vehicle anti-theft device 60 includes a substrate 67. Many electronic components are mounted on the substrate 67. As main components, the substrate 67 has thereon an acceleration sensor 71 for detecting vibrations applied to a vehicle body of the two-wheeled motor vehicle (straddle type vehicle) 10, a GPS (Global Positioning System) unit 72 for determining a current position of the vehicle by receiving orbit information from plural satellites, a GPS antenna 73 attached to the GPS unit 72 to receive signals from the satellites, a control section 70 configured to receive acceleration signals SA from the acceleration sensor 71 and position information JP from the GPS unit 72 and output a command to perform theft countermeasures, a mobile phone communication unit 75 for sending the position information JP to a mobile phone base station 74 in accordance with a communication command signal SC from the control section 70, an alarm generation section 81 for sending an alarm signal SA to actuate alarm devices 78 (lamps such as the headlight 48 and the blinkers 50, 51, and the horn 52 shown in FIG. 1) in accordance with an alarm control signal SAC from the control section 70, a power supply switching circuit 82 for switching power supplies, and a charging circuit 83 for supplying power to a sub battery 88 as a dedicated battery for the vehicle anti-theft device 60.

The vehicle anti-theft device 60 includes the sub battery 88 provided separately from the substrate 67. The sub battery 88 is connected to the control section 70. A main battery 89 is mounted on the vehicle.

Figure 5:
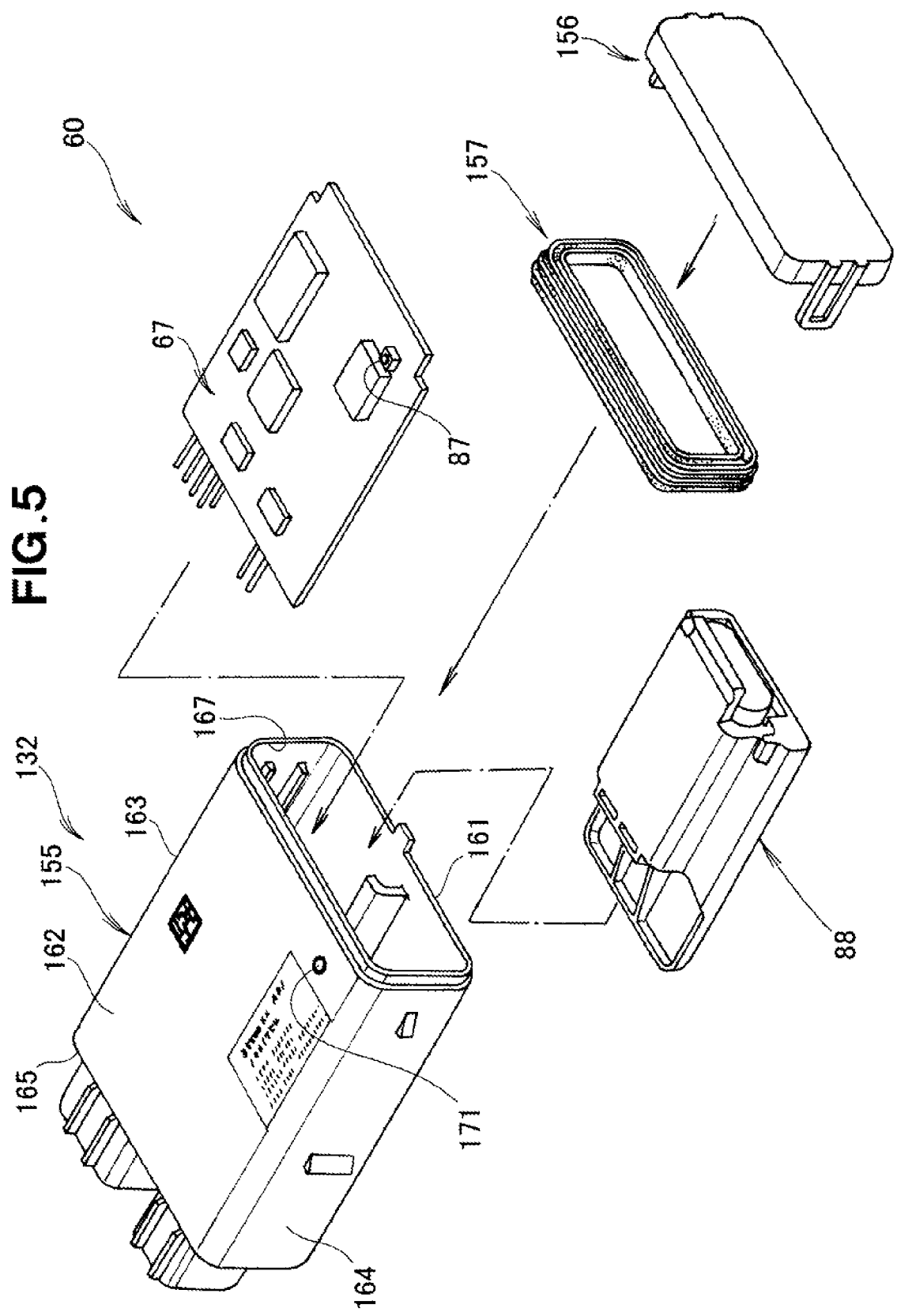
FIG. 5 is an exploded perspective view showing components of the vehicle anti-theft device.

When the vehicle anti-theft device 60 is in an active state, a light emitting diode 87 as a light emitting element is lighted. The light emitting diode 87 is mounted on the substrate 67 as shown in FIG. 5. When a prescribed failure diagnosis operation is performed to the vehicle anti-theft device 60, and the vehicle anti-theft device 60 detects a failure at, for example, the acceleration sensor 71 mounted on the substrate 67, the light emitting diode 87 blinks. By configuring the control section 70 to change the cycle of blinking of the light emitting diode 87 according to the detected failure part, the failure part can be specified.

With the power supply switching circuit 82 to which the main battery 89 and the sub battery 88 are connected, the power supply for the control section 70 can be switched between these power supplies. The sub battery 88 supplies power to the substrate 67 when the main battery 89 mounted on the vehicle does not supply power to the substrate 67. As the sub battery 88, for example, a nickel hydrogen battery or a lithium battery is used.

The mobile phone communication unit 75 includes a communication antenna 92 for sending signals to the mobile phone base station 74, and a SIM (Subscriber Identity Module) tip 93 in which a unique ID number for specifying a telephone number is stored.

Connected to the substrate 67 of the vehicle anti-theft device 60 are external components, i.e., the alarm devices 78 such as the blinkers 50, 51, the horn 52, and the stop lamp 53.

The sub battery 88 connected to the control section 70 actuates the acceleration sensor 71 even when the main battery 89 mounted on the vehicle is removed, and allows the control section 70 to perform arithmetic processing of the output signals from the acceleration sensor 71.

Next will be explained a circuit diagram of the vehicle anti-theft device and the peripheral part thereof.

Figure 4:
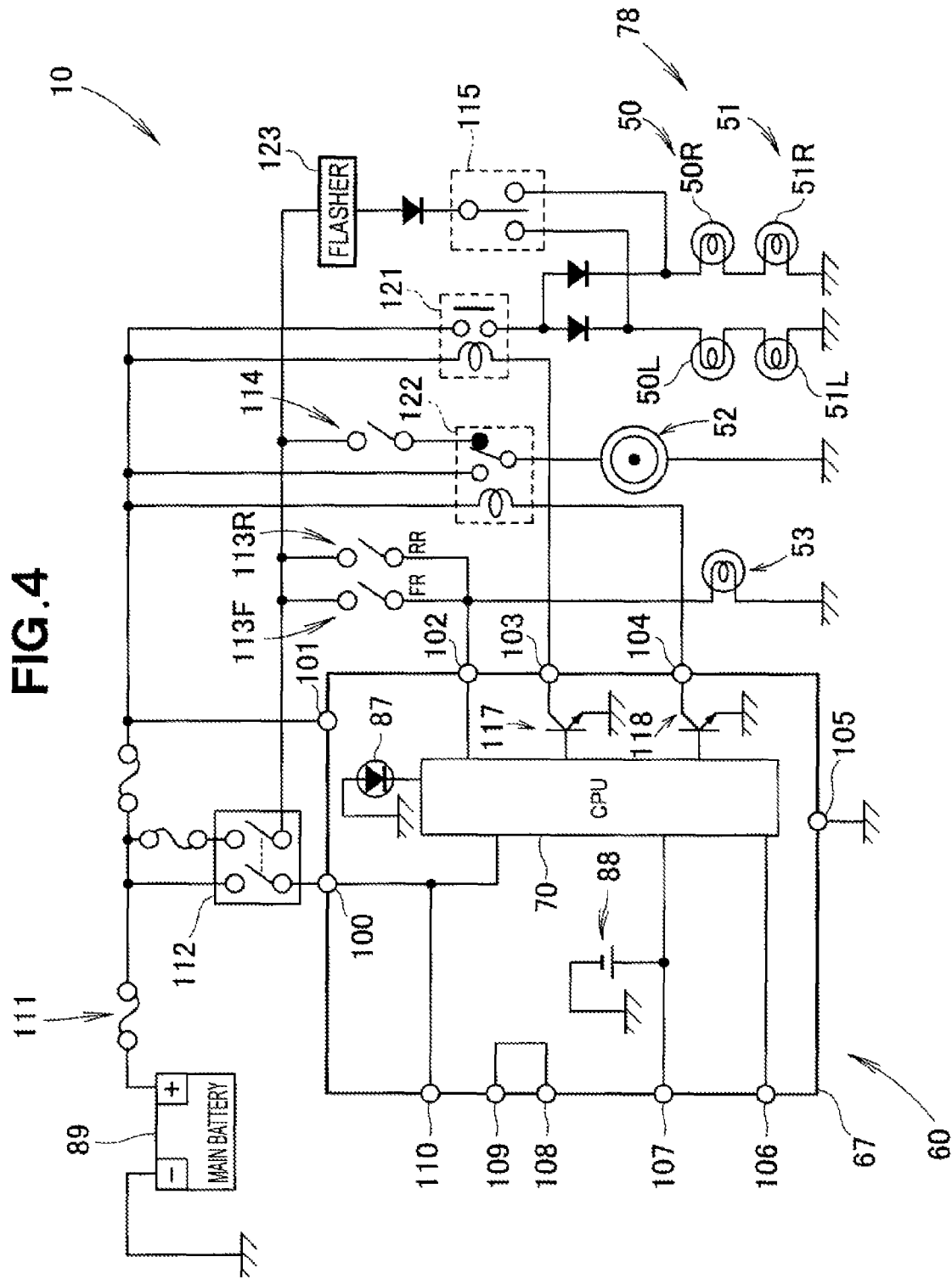
FIG. 4 is a circuit diagram of the vehicle anti-theft device and the peripheral part thereof.

As shown in FIG. 4, the substrate 67 is provided with a plurality of terminals 100 to 110. The main battery 89 is connected to the terminal 100 via a main fuse 111, and power from the main battery 89 is thereby supplied to the terminal 100. The terminals 101, 102 are used for monitoring operation states of an ignition switch 112 which connects and disconnects the main power supply and stop switches 113F and 113R which cause the stop lamp 53 to be lighted.

In the two-wheeled motor vehicle 10 as the vehicle, the horn 52 is activated when a horn switch 114 is operated, and the front blinkers 50 (50L, 50R) and the rear blinkers 51 (51L, 51R) are flashed when a blinker switch 115 provided to the handlebar 41 (FIG. 1) is operated. A flasher 123 for flashing the blinkers 50L, 50R, 51L, 51R is connected to the blinker switch 115.

In an ON state of the ignition switch 112, the horn 52 rings when the horn switch 114 is turned on. The front blinker 50L and the rear blinker 51L are flashed when the blinker switch 115 is turned to "left", and the front blinker 50R and the rear blinker 51R are flashed when the blinker switch 115 is turned to "right". Further, the stop lamp 53 is lighted when a front wheel brake is applied and the stop switch 113F is turned on. Also, the stop lamp 53 is lighted when a rear wheel brake is applied and the stop switch 113R is turned on.

In an OFF state of the ignition switch 112, the horn 52, the blinkers 50L, 50R, 51L, 51R, and the stop lamp 53 are not actuated, even when the horn switch 114, the blinker switch 115, and the stop switches 113F, 113R are operated.

When an abnormality is detected while the vehicle is parked, the control section 70 turns on transistors 117, 118 to operate relays 121, 122 via the terminals 103, 104, thereby activating the horn 52, the blinkers 50L, 50R, 51L, 51R, and the stop lamp 53 to function as alarm means. In this manner, the vehicle anti-theft device 60 is configured to notify to the outside when the vehicle is subjected to a theft action.

Other than the above, the terminal 105 is an earth terminal, and the terminals 106 to 110 are used for diagnosis of the substrate 67, though a description thereof is omitted.

Next will be described a configuration of the vehicle anti-theft device which is mounted to the vehicle for preventing theft of the vehicle.

As shown in FIG. 5, the vehicle anti-theft device 60 includes the box-like case 132, the substrate 67 built in the case 132, the sub battery 88 accommodated in the case 132 at a position below the substrate 67 for supplying power to the substrate 67, a lid 156 for closing an opening 167 of the case 132, and a seal member 157 provided between the lid 156 and the opening 167 of the case 132 to seal between the lid 156 and the opening 167. The case 132 has a case body 155, and the lid 156 detachably attached to the case body 155.

The case body 155 is formed of a bottom 161, a ceiling 162, a left wall 163 extending between left edges of the ceiling 162 and the bottom 161, a right wall 164 extending between right edges of the ceiling 162 and the bottom 161, and a rear wall 165 enclosed by rear edges of the ceiling 162, the bottom 161, the left wall 163, and the right wall 164.

The seal member 157 is provided between the case body 155 and the lid 156.

As described above, the vehicle anti-theft device 60 is mounted to the vehicle 10 (FIG. 1) and configured to detect abnormality of the vehicle 10 and notify it to the outside when the vehicle is subjected to a theft action.

The substrate 67 is removably received in the case 132 via the opening 167. Similarly, the sub battery 88 as the dedicated battery is removably received in the case 132 via the opening 167. Further, the seal member 157 and the lid 156 are detachably attached to the opening 167 of the case 132.

Namely, the lid 156 is detachably attached to the body 155, so that the substrate 67 and the sub battery 88 can be put into and out of the case 132. The light emitting element 87 is mounted on the substrate 67 at a position close to the lid 156.

Next will be described a hole formed in the bottom of the case, and a resin lens secured to the ceiling of the case.

Figure 6:
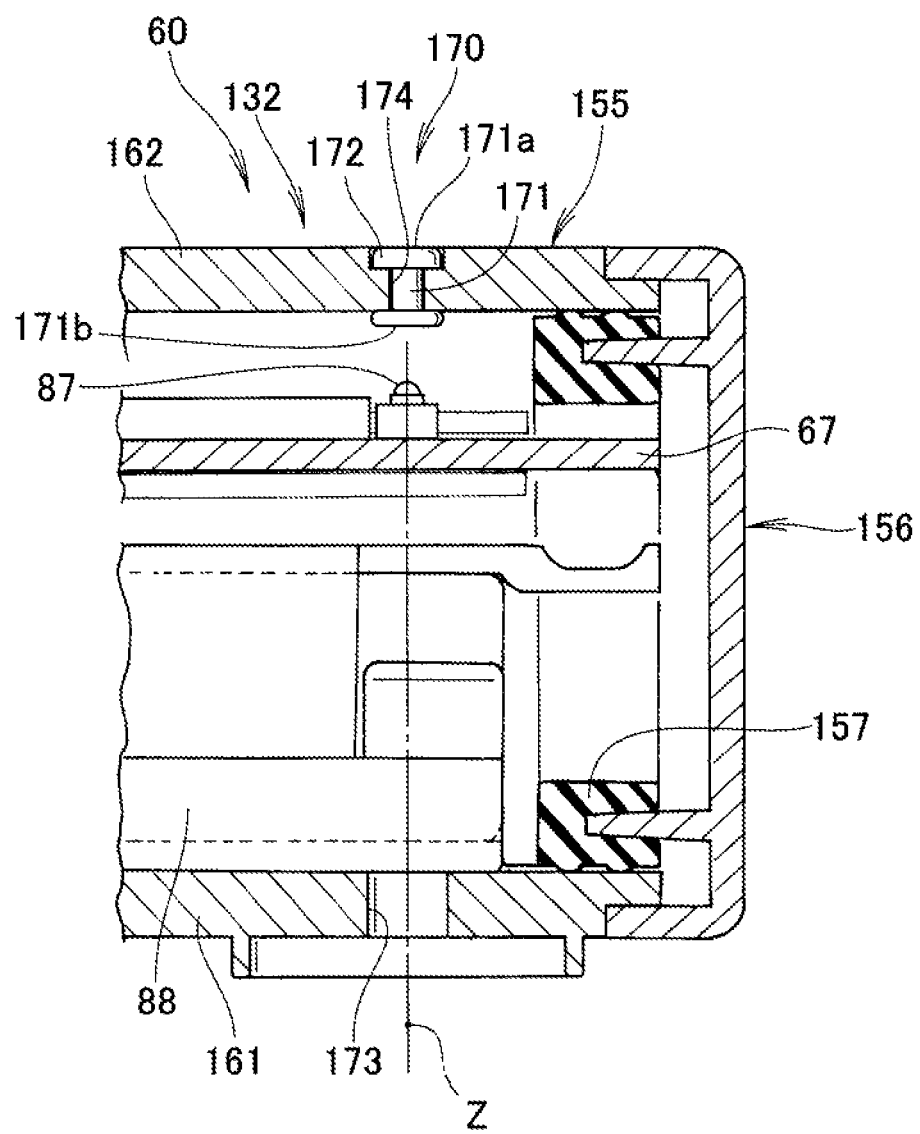
FIG. 6 is a cross-sectional view of a case of the vehicle anti-theft device, showing a positional relationship between a hole and a resin lens.

As shown in FIG. 6, the vehicle anti-theft device 60 includes the box-like case 132, the substrate 67 built in the case 132, and an operation display member 170 secured to the ceiling 162 of the case 132 for transmitting a operation state of the vehicle anti-theft device 60 to outside of the case 132.

The operation display member 170 is composed of the light emitting diode 87 as the light emitting element, and a resin lens 171 welded to the ceiling 162 of the case 132 for transmitting therethrough light from the light emitting diode 87. The light emitting diode 87 is mounted on the substrate 67, on which the electronic components for actuating the operation display member 170 are mounted, so that the light emitting diode 87 is operated by the substrate 67.

It should be noted that the light emitting element is not limited to the light emitting diode (LED), and may be an electric bulb, an organic EL element, an electrode tube, or any other light emitting element which can be mounted to the substrate.

The box-like case 132 has on the bottom 171 a hole 173 through which air comes in and goes out.

The operation display member 170, which is composed of the light emitting element (light emitting diode) 87 and the resin lens 171, is mounted with its central axis Z vertically aligned with a perpendicular line extending from a center of the hole 173.

Next will be a description of processes for welding the resin lens to the ceiling of the case.

Figure 7:
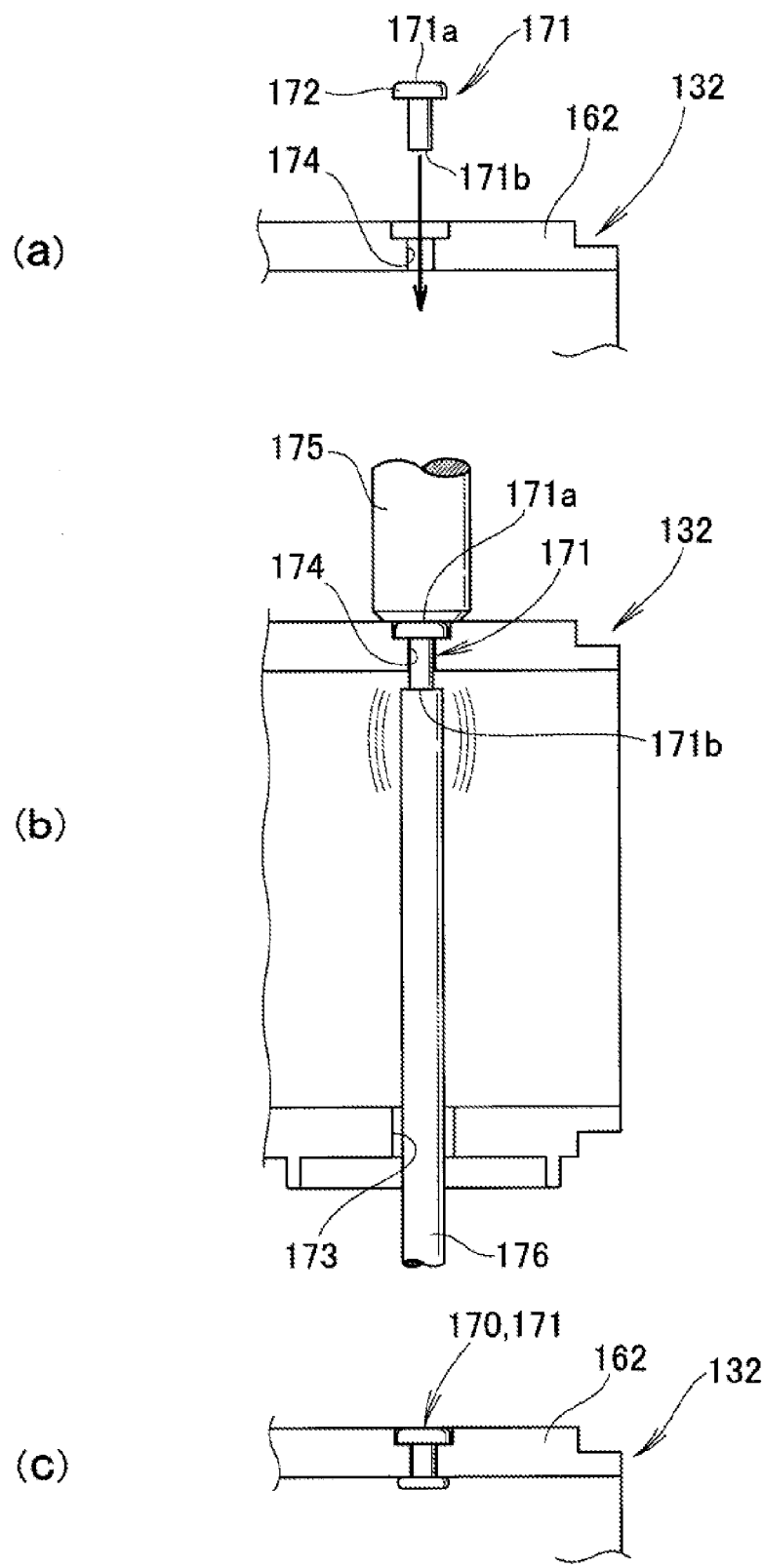
FIGS. 7(a) to 7(c) are views explanatory of processes for welding the resin lens to the case.

As shown in FIG. 7(*a*), the resin lens 171, which is formed of a translucent member and has a flange 172, is fitted from above to a set hole 174 formed in the ceiling 162 of the case 132.

As shown in FIG. 7(b), an upper surface 171a of the resin lens 171 fitted to the set hole 174 is then pressed from above by a pressing tool 175, so that the resin lens 171 is fixed in position on the ceiling 162 of the case 132. Then, a lower surface 171b of the resin lens 171 is pressed from below by a tool 176 inserted from the hole 173. While keeping this condition, the tool 176 is vibrated to thereby heat and fuse the lower surface 171b of the resin lens 171.

As shown in FIG. 7(c), the lower surface 171b of the resin lens 171, which has been heated and fused by means of the tool 176, is bulged outwardly of the resin lens 171, and thereby tightly secured to the ceiling 162.

Namely, the resin lens 171 constituting the operation display member 170 is secured to the ceiling 162 of the case 132 by means of the tool 176 inserted from the hole 173.

Reference is now made also to FIG. 6, the resin lens 171 of the operation display member 170 is fitted to the ceiling 162 from the outside, the upper surface 171a of the resin lens 171 is then pressed from above by the pressing tool 175, and the resin lens 171 is secured by vibration welding to the ceiling 162 by means of the tool 176 inserted from the hole 173, whereby the operation display member 170 is secured to the ceiling 162.

Since the central axis Z of the operation display member 170 coincides with the central axis Z of the hole 173, the insertion and operation of the tool 176 can be easily performed. As a result, the manufacturing cost of the vehicle anti-theft device 60 including the operation display member 170, which transmits the operation state of the substrate 67 to the outside of the case 132, can be reduced.

Thus, according to the present invention, there is provided the vehicle anti-theft device which enables reduction of the manufacturing cost, without increasing the number of necessary components, by facilitating the attachment operation of the operation display member.

As described above, the operation display member 170 is composed of the light emitting diode (light emitting element) 87, and the resin lens 171 which is welded to the ceiling 162 and transmits therethrough light from the light emitting diode 87, as shown in FIG. 6.

If the operation display member 170 is a lamp having a glass bulb and a light emitting body surrounded by the glass bulb, it is required to form in the ceiling 162 a set hole having a diameter corresponding to that of the glass bulb and fit the glass bulb to the set hole. In this case, the set hole is necessarily large in diameter.

In the present invention, the light emitting body is separated from the glass bulb, and the light emitting element such as the light emitting diode 87 and the resin lens 171 are used instead of the light emitting body and the glass bulb.

For the resin lens 171 alone, the set hole 174 formed in the ceiling 162 can be smaller in diameter, and the small-diameter set hole 174 can be easily waterproofed.

The light emitting element such as the light emitting diode 87 is mounted on the substrate 67 at the position close to the lid 156

By removing the lid 156 from the case 132 and slightly drawing out the substrate 67, the light emitting diode 87 is exposed to outside the body 155. Namely, it is possible to see and check the light emitting diode 87 without greatly drawing the substrate 67 out of the case 132. As a result, the maintenance property of the light emitting diode 87 can be improved.

Further, the seal member 157 is provided between the body 155 and the lid 156.

With the seal member 157 being provided between the body 155 and the lid 156, it is possible to secure the seal property between the body 155 and the lid 156.

Whereas the present invention has been described as having been applied to a two-wheeled motor vehicle in the preferred embodiment, the present invention is not so limited, and may also be applied to a three-wheeled straddle type vehicle (three-wheeled buggy), a four-wheeled straddle type vehicle (four-wheeled buggy), or other ordinary small vehicles.

Further, in FIG. 3, an engine control section may also be provided which is capable of sending an ignition stop signal to an ignition device of the engine, based on an engine control signal from the control section, to thereby stop the operation of the ignition device.

INDUSTRIAL APPLICABILITY

The present invention is well suited for use as a vehicle anti-theft device for two-wheeled motor vehicles.

REFERENCE CHARACTERS

10 . . . vehicle (two-wheeled motor vehicle), 67 . . . substrate, 87 . . . light emitting element (light emitting diode), 88 . . . dedicated battery (sub battery), 132 . . . case, 155 . . . case body, 156 . . . lid, 157 . . . seal member, 161 . . . bottom, 170 . . . operation display member, 171 . . . resin lens, 173 . . . hole, 176 . . . tool

The invention claimed is:

1. A vehicle anti-theft device adapted to be mounted on a vehicle for preventing theft of the vehicle, comprising:
 a box-shaped case having on a bottom thereof a hole through which air comes in and goes out;
 an operation display member for transmitting an operation state of the vehicle anti-theft device to outside of the case, the operation display member having a center vertically aligned with a center of the hole and secured to a ceiling of the case by means of a tool inserted from the hole; and
 a substrate built in the case and having electronic components mounted thereon for operating the operation display member; and
 a dedicated battery accommodated in the case for supplying power to the substrate, said battery being disposed below the substrate in the case;
wherein:
 the operation display member comprises
  a light emitting element mounted on the substrate, and
  a resin lens welded to the ceiling for transmitting therethrough light from the light emitting element;
 the case includes
  a case body, and
  a lid detachably attached to the case body so as to allow the battery and the substrate to be inserted in or removed from the case,
  wherein the light emitting element is mounted on the substrate at a position close to the lid;
 the battery and the substrate are formed separately from each other;
 the battery and the substrate are each insertable into or removable from said case; and
 a direction of insertion or removal of the battery and the substrate is perpendicular to a central axis of the operation display member.

2. The vehicle anti-theft device of claim 1, wherein the case further includes a seal member provided between the body and the lid.

\* \* \* \* \*